United States Patent [19]

Forrer

[11] Patent Number: 4,576,529

[45] Date of Patent: Mar. 18, 1986

[54] MULTIPURPOSE CLAMPING DEVICE FOR WORKPIECES, PARTICULARLY OF WOOD

[76] Inventor: Hans Forrer, Feldweg 854, Oberhelfenschwil, Switzerland

[21] Appl. No.: 588,042

[22] Filed: Mar. 9, 1984

[30] Foreign Application Priority Data

Mar. 9, 1983 [CH] Switzerland .......................... 1274/83

[51] Int. Cl.[4] .............................................. B23P 23/09

[52] U.S. Cl. .................................. 408/240; 29/560.1; 408/712

[58] Field of Search ................. 29/560.1; 269/244, 88, 269/43, 87.3, 283, 285, 240, 246, 252, 253; 408/712

[56] References Cited

U.S. PATENT DOCUMENTS

| | | | |
|---|---|---|---|
| 895,953 | 8/1908 | Brewer | 269/252 X |
| 1,196,838 | 9/1916 | Bodene | 269/253 X |
| 1,630,993 | 3/1927 | West | 269/283 |
| 2,768,663 | 10/1956 | Jones | 408/712 X |

FOREIGN PATENT DOCUMENTS

| | | | |
|---|---|---|---|
| 2110924 | 9/1972 | Fed. Rep. of Germany | 408/712 |

*Primary Examiner*—Eugene F. Desmond

*Attorney, Agent, or Firm*—McGlew and Tuttle

[57] ABSTRACT

A multipurpose clamping device for a modular tool comprise first and second clamping jaw members each of which has a front face with an aligned modular tool clamping receiving opening. The jaw members include base portions with side rails extending therethrough at spaced lateral locations providing means facilitating the movement of the jaw members toward and away from each other without canting. The clamping device is associated with each opening to clamp the tool in position. The clamping device may be used as a vise by inserting a vise clamping jaw into each opening of each member and in such instance the spindle is advantageously threaded to each member to permit members to move upon driving of a threaded spindle member. The device may also be used for example as a support for a hand drill which may have its forwarded end inserted in the opening and clamped therein so as to line a tool receiving chuck therein which may be rotated and align it with a tailstock center carried by the other jaw member.

7 Claims, 6 Drawing Figures

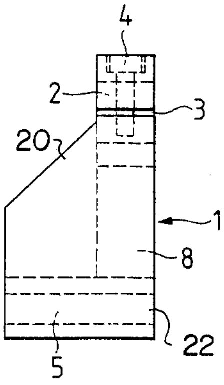
FIG. 1a
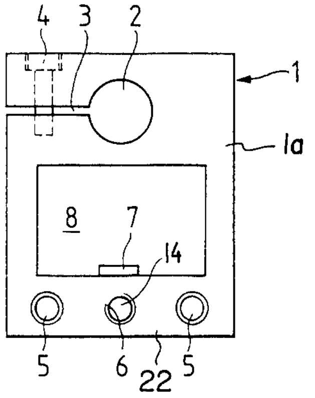
FIG. 1b
FIG. 4b
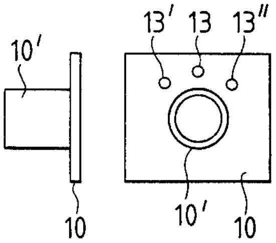
FIG. 4a
FIG. 2
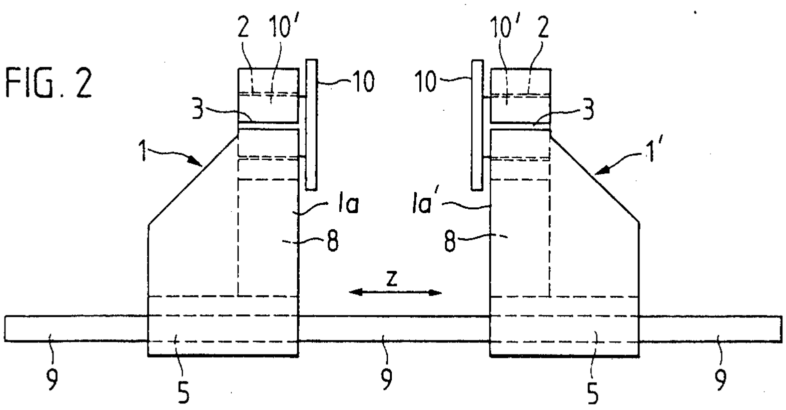
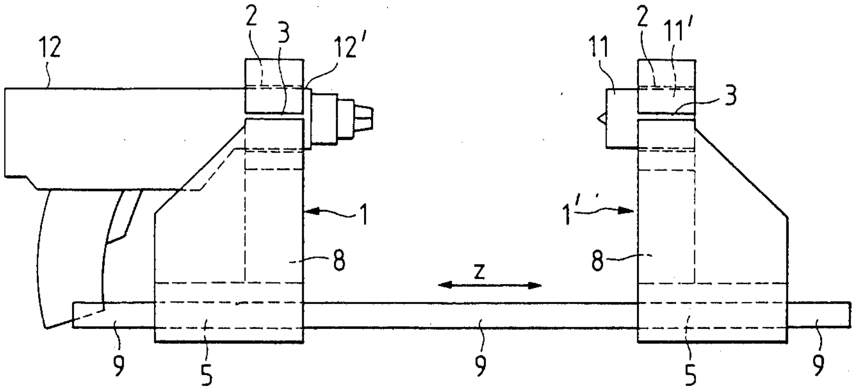
FIG. 3

MULTIPURPOSE CLAMPING DEVICE FOR WORKPIECES, PARTICULARLY OF WOOD

FIELD AND BACKGROUND OF THE INVENTION

This invention relates in general to clamping devices and in particular to a new and useful device for holding modular tools so that they may be operated together in an arrangement.

A clamping device, such as a vise, particularly a parallel vise, serves the purpose of firmly clamping a workpiece during the machining, for example shaping with a file, sawing or cutting. More universal types of clamping devices having clamping jaws which are displaceable parallel to each other offer primarily substantially larger throat areas and sometimes are equipped with quick-action clamping mechanisms permitting fast clamping and unclamping. Such kinds of clamping devices have to clamp a workpiece, or hold it fast or compressed, thus establishes static conditions upon tightening the power screw. A good clamping device may also form the base of a more complex working mechanism and thus serve a multiple and higher purpose. The invention is directed to a design of such a multiple purpose device.

SUMMARY OF THE INVENTION

This invention provides a multipurpose clamping device for modular tools or other tools which comprises first and second clamping jaw members having front faces with aligned modular tool clamping receiving openings. The clamping jaw members are mounted on guide elements in the form of rods to permit them to be slid toward and away from each other without canting from one side to the other. For such purpose jaw members are advantageously mounted on spaced apart rod members and they are moved back and forward by a rotatable spindle which engaged threaded portions in either one or both of the jaw members.

The apertures which are provided on the front face of the jaw members provide jaws which may be clamped to hold a modular tool therein. The tool parts are advantageously secured by jaw formations which comprise a central receiving opening and an elongated entrance slot defining an arm portion above the main portion of the jaw member which may be sprung closed in a clamping fashion by a clamping screw. The device may be used for example as a vise by clamping modular tool vise jaws in each opening. Alternatively the device may be used as a mounting for a hand drill which may be aligned with a tailstock center carried by the other jaw member.

Accordingly it is an object of the invention to provide a clamping device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1*a* is a side elevational view of a clamping jaw member constructed in accordance with the invention;

FIG. 1*b* is a front elevational view of the jaw shown in FIG. 1*a;*

FIG. 2 is a side elevational view of a clamping arrangement with the two jaw members mounted for relative backward and forward movement;

FIG. 3 is a view similar to FIG. 2 shown in another embodiment of the invention;

FIG. 4*a* is side elevational view of a modular tool in the form of a vise jaw; and FIG. 4*b* is a rear elevational view of the vise jaw shown in FIG. 4*a*.

DESCRIPTION OF THE PREFERRED EMBODIMENTS

Referring to the drawings in particular the invention embodied therein comprises a multipurpose clamping device generally designated 1 particular for tools and modular tools such as a modular tool vise jaw 10 as shown in FIGS. 4*a* and 4*b*. Clamping device 1 includes first and second clamping jaw members 1 and 1' each of which have a front face with modular tools clamping receiving openings 2 which align. Guide means are provided for guiding clamping jaw members 1 and 1' toward and away from each other and they advantageously comprise spaced rod members 9,9 which engage in bores 5,5 and permit guidance of the clamping jaws without canting. The modular tool is clamped in the opening 2 by means of a clamp formed and a provision of a clamping slot 3 extending from the opening 2 to a side of the member 1. The portion of the member which is above the slot 3 is biased downwardly by an adjusting screw 4 to clamp the desired tool or modular tool in position.

FIGS. 1*a* and 1*b* show a clamping jaw in accordance with the invention in two views. Clamping jaw 1 in its most simple design is a braced frame having back fins portion with an oblique edge 20 as shown in FIG. 1*a* and a base part 22 with two slide guides 5 and a spindle aperture 6. A quick-action clamping mechanism 7 may be provided which may well be braced in the jaw window 8. Jaw window 8 is a recess in the material provided for reasons of strength or serving the purpose of reducing the weight and thus saving material. In the upper portion of the clamping jaw frame, clamping aperture 2 is provided for receiving modular tools or tool holders 10 which are fixed therein by clamping the two legs formed by clamping slot 3, together. The clamping may be effected in a simple manner for instance by means of clamping screw 4. Two such clamping jaws 1 and 1' are provided which are in opposite positions and displaceable toward each other in the manner of a slide on the two spaced apart guide rails 9, so as to prevent canting. The clamping force is produced by a spindle 14 with opposite threadings and which engages in a threaded aperture 6. The spindle is equipped with an adequate handle or other means to rotate it.

FIG. 2 shows a clamping device with two clamping jaws 1 and 1' which are arranged opposite to each other and, as shown by double arrow z, are displaceable toward or away from each other. Only one of the jaws or both may be movable at the same time. Both jaws have clamping aperture 2 in which modular tool 10 is secured, in this example two vise jaws 10 have a sleeve-shaped clamping seat 10', which is inserted into the clamping aperture 2 and held fast by means of the clamping screw 4. In this arrangement the clamping device operates as a parallel vise having a relatively large throat area. Another application of the invention is shown in FIG. 3.

Basically, it is possible to consider the above described clamping device within certain limits as a lathe having a bed and a slide and requiring only a rotary drive in addition. FIG. 3 shows such an arrangement. In the fixed clamping jaw 1, a hand drill 12 is received as a rotary drive. The hand drill or drill gun is clamped in clamping aperture 2 as a modular tool. The head portion 12' of the gun then forms a lining or seat in the aperture and the head of the gun operates as a chuck freely turning therein. The opposite jaw 1' is movable as a slide and carries a modular tool in its clamping aperture 2, namely a tailstock center 11 which is clamped in a clamping seat 11'. With this arrangement, which also has a rather small weight, wood may be turned, cylindrically ground, etc. Should a machining of metal be provided, a necessary strength must be ensured for the entire construction.

FIGS. **4*a* and 4*b* show a special design of vise jaws as modular tools. At the side of the body 10' of the jaw, engaging bores 13,13' and 13" are provided, for example spotfaced, in jaw plates 10. The purpose thereof is to be able to use the clamping jaws in various definite positions. In the shown example, the engaging bores 13',13" are provided to make possible to displace the vise jaw through 45° to either side relative to the central bore 13**. By inserting modular tools, the clamping device may be built up to a complex working means as mentioned above.

While specific embodiments of the invention have been shown and described in detail to illustrate the application of the principles of the invention, it will be understood that the invention may be embodied otherwise without departing from such principles.

What is claimed is:

1. A multi-purpose clamping device for a modular tool comprising:

first and second clamping jaw members each having a front face with a modular tool clamping receiving opening which are each aligned with each other, guide means on which said jaw members are movable toward and away from each other without canting, securing means for securing a tool in the respective receiving opening, said first and second clamping jaw members each having a spindle opening therethrough extending parallel to the direction of movement of said jaw members, a spindle with opposite threads in said spindle openings of said jaw members, and a quick-action clamping mechanism in each jaw member engageable with said spindle for movement of a respective jaw member along said spindle with rotation of said spindle.

2. A multipurpose clamping device according to claim 1, wherein said securing means comprises clamping openings having a slot extending therefrom to a side of said clamping jaw member and an adjustment screw threaded to said adjusting jaw member and through the slot and being threadable to bias a portion of the clamping member into the slot to clamp the tool in the opening.

3. A multipurpose clamping device according to claim 1, wherein the openings comprise a cylindrical opening for accommodating a tool vise, and a tool vise having a cylindrical portion extending into the cylindrical opening.

4. A multipurpose clamping device according to claim 3, wherein said clamping device comprises a vise and including a vise modular tool having a front plate with engaging bores and a rear with a cylindrical seat portion engaged into the opening of each clamping jaw member.

5. A multipurpose clamping device according to claim 1, including a tailstock center modular tool including a tailstock portion in a cylindrical portion engaging in the opening.

6. A multipurpose clamping device according to claim 1, including a hand drill having a cylindrical head portion engaged in the opening and having a tool holding stock extending out of the opening in a direction toward the other clamping member and including a tailstock mounted in the opening of the other of said clamping jaw members.

7. A multipurpose clamping device according to claim 1, wherein said clamping jaw members each include a rectangular front face having a cylindrical opening centered therein adjacent the upper portion thereof, a jaw window formed in the central portion thereof having a clamp therein, said clamping jaw members each having a base portion with threaded bore and at least two slide guide bores and a guide rod extending in each of said slide guide bores, the threaded spindle extending into the threaded bore.

* * * * *